US 6,738,715 B2

(12) United States Patent
Shatilo et al.

(10) Patent No.: US 6,738,715 B2
(45) Date of Patent: May 18, 2004

(54) METHOD FOR ATTENUATING NOISE IN SEISMIC DATA

(75) Inventors: Andrew P. Shatilo, Houston, TX (US); Richard E. Duren, Conroe, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/072,588

(22) Filed: Feb. 5, 2002

(65) Prior Publication Data

US 2003/0055569 A1 Mar. 20, 2003

Related U.S. Application Data

(60) Provisional application No. 60/322,504, filed on Sep. 14, 2001.

(51) Int. Cl.⁷ .................................................. G01V 1/00
(52) U.S. Cl. ........................................... 702/17; 702/14
(58) Field of Search ....................... 702/17, 14; 367/73, 367/24, 38

(56) References Cited

U.S. PATENT DOCUMENTS

| | | | |
|---|---|---|---|
| 4,380,059 A | 4/1983 | Ruehle | 367/46 |
| 4,486,865 A | 12/1984 | Ruehle | 367/24 |
| 4,860,265 A | 8/1989 | Laster et al. | 367/73 |
| 4,884,248 A | 11/1989 | Laster et al. | 367/73 |
| 4,979,150 A | 12/1990 | Barr | 367/24 |
| 5,067,112 A | 11/1991 | Meek et al. | 367/43 |
| 5,138,583 A | * 8/1992 | Wason et al. | 367/38 |
| 5,191,526 A | 3/1993 | Laster et al. | 364/21 |
| 5,365,492 A | 11/1994 | Dragoset, Jr. | 367/21 |
| 5,550,786 A | 8/1996 | Allen | 367/48 |
| 5,774,417 A | * 6/1998 | Corrigan et al. | 367/24 |
| 6,021,090 A | 2/2000 | Gaiser et al. | 367/15 |
| 6,049,507 A | 4/2000 | Allen | 367/21 |
| 6,101,448 A | 8/2000 | Ikelle et al. | 702/17 |
| 6,151,556 A | 11/2000 | Allen | 702/18 |
| 6,292,754 B1 | * 9/2001 | Thomsen | 702/14 |
| 6,314,371 B1 | * 11/2001 | Monk | 702/17 |

FOREIGN PATENT DOCUMENTS

WO    WO 00/02155    1/2000    ........... G06F/19/00

OTHER PUBLICATIONS

Soubaras, Robert, 2001, "Dispersive Noise Attenuation for Converted Wave Data", 71st Ann. SEG Int. Mtg. Expanded Abstract Biog. V 1, (San Antonio, TX) Sep. 9–14, 2001, pp. 802–805.

(List continued on next page.)

Primary Examiner—John Barlow
Assistant Examiner—Victor J. Taylor
(74) Attorney, Agent, or Firm—Gary P. Katz

(57) ABSTRACT

The invention is a method for attenuating noise in seismic data traces, in which at least a portion of the noise is noncoherent in the common-shot domain but coherent in the common-receiver domain, the coherent noise having a move-out velocity different from the move-out velocity of the data signal in the seismic data traces. The method comprises sorting the seismic data traces into common-receiver order and using the difference in move-out velocities to separate the coherent noise from the data seismic signal. This method is useful in suppressing noise in two and four-component ocean bottom cable data.

35 Claims, 9 Drawing Sheets

OTHER PUBLICATIONS

Soubaras, R., 1996, "Ocean–Bottom Hydrophone and Geophone Processing", $66^{th}$ Annual SEG Mtg. Expanded Abstracts, pp. 24–27.

Star, Joel G. et al, 2001, "The Yaser 3D OBC Survey: A Case History in Multiple Attenuation in the Arabian Gulf", Gulf PetroLink.com, Ref No. 106, pp. 1–2.

Anderson, Kenneth, (2002) Inventor's Affidavit, 2 pgs.

Starr, Joel G. et al., "The Yaser 3D OBC Survey: A case history in multiple atte in the Arabian Gulf", Gulf PetrolLink.com, Ref. No. 106, Sep. 7, 2001.

Claerbout, J., "Eliminating Crosstalk", Geophysics: The Leading Edge of Exploration, Apr. 1990, pp. 38–40.

Li, Xiang–Yang et al., "Geophone Orientation and Coupling in Three Component Sea–Floor Data: A Case Study", Geophysical Prospecting, 1999, vol. 47, pp. 995–1013.

Reid, F. et al., "Tests of Vector Fidelity in Permanently Installed Multi–Component Sensors", 70th Annual SEG Int. Mtg. Exp. Abstr. Biogr., 2000, v. 1, pp. 1213–1216.

Amundsen, Lasse et al., "Decomposition of Multicomponent Sea–Floor Data Into Upgoing and Downgoing P–and S–Waves", Geophysics, vol. 60, No. 2, Mar.–Apr. 1995, pp. 563–572.

Dankbaar, J.W.M., "Separation of P–and S–Waves", Geophysical Prospecting, 1985, vol. 33, pp. 970–986.

Donati, Maria S. et al., "P–and S–Wave Separation at a Liquid–Solid Interface", Journal of Seismic Exploration, 1996, vol. 5, pp. 113–127.

Diamond Geoscience Research Corporation advertisement, "Breakthrough 3–D Technologies!", 2 pages.

\* cited by examiner

METHOD FOR ATTENUATING NOISE IN SEISMIC DATA

This application claims the benefit of U.S. Provisional Application No. 60/322,504 filed Sep. 14, 2001.

FIELD OF INVENTION

This invention generally relates to the field of seismic prospecting. More particularly, this invention relates to a method for attenuating noise from seismic data.

BACKGROUND OF THE INVENTION

Marine seismic exploration usually involves acquiring seismic data using a seismic acquisition system whose source initiates a down-going seismic wavefield. A portion of the down-going wavefield travels into the underlying earth where it illuminates subsea geologic formations. As it illuminates the interfaces or boundaries between the formations, part of the wavefield is returned (or reflected) back through the earth (propagating in the up-going direction). Part of the reflected wavefield is received by the seismic acquisition system, converted into electrical signals, and recorded for subsequent processing. An analysis of these recorded signals makes it possible to estimate the structure, position, and lithology of subsea geologic formations, thereby completing an important step in the exploration process.

FIG. 1 shows a simplified example of a typical marine seismic acquisition system. A first ship 1 tows a seismic source 2 several feet below the surface 3 of the ocean. The seismic source 2 is activated to produce a down-going wavefield 4d that is at least partially reflected by a subsea formation boundary (i.e., an impedance discontinuity) 5. The up-going wavefield 4u then travels toward the sensors 6 and is detected.

The sensors 6 used in typical marine seismic exploration include pressure sensors and velocity (also referred to as "particle velocity") sensors. Typically, the pressure sensors are hydrophones and the velocity sensors are geophones. The hydrophones measure a scalar pressure and are not sensitive to the propagation direction of the wavefield. The geophones, which may be vertical geophones, provide vector response measurement whose polarity depends on whether the direction of propagation of the wavefield is up-going or down-going. The amplitude of the geophone response is also related to an angle of the propagation relative to the sensitive direction of the geophone. If a wavefield is recorded by a hydrophone and a vertical geophone having the same electronic impulse response, then a polarity comparison between the hydrophone and geophone measurement determines whether the wavefield is propagating in the up-going or down-going direction. Hydrophones and geophones disposed at the seafloor are typically used in pairs when collecting seismic data.

A pressure and vertical velocity combination from two-component (2C) or from multi-component (typically 4C) has been useful to cancel down-going multiples from a combined pressure and vertical velocity data signal. Noise that is present on one or the other of these sensors can limit the effectiveness of the combination technique. This invention attenuates noise that is normally present during data acquisition and has been found to be an important processing step before the combination.

In one type of marine seismic surveying, the sensors 6 are located at regular intervals in one or more ocean bottom cables (OBC) 7 that are arranged on the seafloor 9. When necessary, a second ship 8 is used to move the OBC 7 to a new position on the seafloor 9. Several miles of OBC 7 are typically deployed along the seafloor 9, and several OBCs are typically deployed in parallel arrangements. OBC 7 arrangements are particularly well suited for use in certain zones (i.e., zones cluttered with platforms or where the water is very shallow) where the use of ship-towed hydrophone arrays (not shown) (which are located proximate to the ocean surface 3 and are typically referred to as "streamers") is not practical. In another type of seismic surveying, the hydrophones and geophones are deployed on the ocean bottom as separate ocean bottom stations (OBS). A combination of separate OBS and OBC can be deployed. The geophone and hydrophone must be connected to a recording instrument typically on a vessel.

As shown in FIG. 2, in another type of marine seismic surveying, a marine cable or streamer 21 incorporating pressure hydrophones are designed for continuous towing through the water. A marine streamer 21 is typically made up of a plurality of active or live hydrophone arrays 23 separated by spacer or dead sections 25. Usually the streamers are nearly neutrally buoyant and depth controllers or depressors 27 are attached to depress the streamer 21 to the proper towing depth. A tail buoy with a radar reflector 29 is typically attached to the end of the streamer. The entire streamer may be 3–6 Km in length and is towed by a ship 31.

Seismic energy is transmitted by "body waves," which can be either compressional waves (P-waves) or shear waves (S-waves). P-waves are elastic solid waves in which particle motion is in the direction of propagation. S-waves are body waves in which the particle motion is perpendicular to the direction of propagation. Seismic energy can also be transmitted along boundaries between substances having different elastic properties by "surface waves."

Claerbout has disclosed that there is "crosstalk" between vertical and horizontal geophones due to non-vertical incidence of P and S reflected waves at the water bottom (Claerbout, J., The Leading Edge, v. 9, No. 4, pp. 38–40, April 1990). Crosstalk occurs when the vertical geophone records at least part of the S-wave energy. This energy becomes noise because the combination processing step assumes only P-waves. Other researchers have attributed this noise to non-perfect coupling and orientation of OBC geophones (Li, X. Y. and Yuan, J., Geophysical Prospecting v 47, No. 6, pp 995–1013, November 1999). It has also been suggested that this noise will be eliminated when the vector fidelity problem for OBC geophones is solved with the next generation of OBC hardware (Reid, F. and Macbeth, C. 70th Annual SEG. Int. Mtg. Expanded Abstr. Biogr. v. 1, pp 1213–1216, 2000). In addition, all the prior art methods attribute the "leakage noise" in the vertical geophone to shear waves, thus they do not consider other possible sources of the coherent noise (e.g., surface related waves).

In general, the industry recognizes that OBC vertical geophone data is typically noisy. FIG. 3(a) shows seismic data traces collected using a hydrophone on an ocean bottom cable. FIG. 3(b) shows the corresponding geophone seismic traces collected using a vertical geophone on the same ocean bottom cable. As can be seen in FIGS. 3(a) and 3(b) there is significantly less noise from the seismic data traces collected with the hydrophone.

Practical attempts to suppress this noise usually include considering the acquisition system (i.e., vector fidelity, coupling, orientation) and then treating the noise as a random noise in the common-shot domain or common-shot order. There is lack of successful examples of noise suppression examples in real OBC seismic data. The lack of understanding on how to attenuate this noise has led to noise contaminated results of 2C OBC data combination worldwide. In some parts of the world (e.g., Gulf of Mexico), the noise is so severe that 2C OBC data is often considered to be useless. Accordingly, there is a need to attenuate, efficiently filter, or suppress at least part of this noise from OBC data. The present invention satisfies this need.

SUMMARY OF THE INVENTION

One aspect of the invention is a method for attenuating noise in seismic data traces, at least a portion of the noise is noncoherent in the common-shot domain but coherent in the common-receiver domain. The coherent noise has a move-out velocity different from the move-out velocity of the data signal in the seismic data traces. The method comprises (a) sorting the seismic data traces into common-receiver order; and (b) using the difference in move-out velocities to separate the coherent noise from the data signal.

In another aspect, the invention is a method for attenuating noise in two-component or multi-component ocean bottom cable (OBC) seismic data traces. The OBC seismic data traces comprises hydrophone data traces and vertical geophone data traces, at least a portion of the noise in the data traces being noncoherent in the common-shot domain but coherent in the common-receiver domain. The coherent noise has a move-out velocity different from the move-out velocity of the data signal in the seismic data traces. The method comprises: (a) sorting the data traces into common-receiver order; (b) applying a move-out correction to the data traces using a move-out velocity chosen to overcorrect the data signal and undercorrect the coherent noises; (c) transforming the move-out corrected data traces from the x-t domain to a two-dimensional domain in which the move-out corrected data signal and the move-out corrected noise are separated; (d) removing at least a portion of the coherent noise from the transformed data traces; and (e) inverse transforming the data traces from the two-dimensional domain back to the x-t domain. Furthermore, an inverse moveout may be performed after the traces are transformed back to x-t domain with the velocity used in step (b).

DETAILED DESCRIPTION

We have discovered that at least part of the geophone noise is noncoherent in common-shot order but coherent in common-receiver order. This coherency represents a major property allowing separation of the noise and the signal. Coherent properties of the noise in the common-receiver order has not been noticed by some major seismic contractors. Those who recognize coherency of the noise have suggested a number of theories explaining the noise origin. As discussed previously, most of the theories define the observed noise as being related to shear wave energy recorded on vertical geophone.

Figure 4:
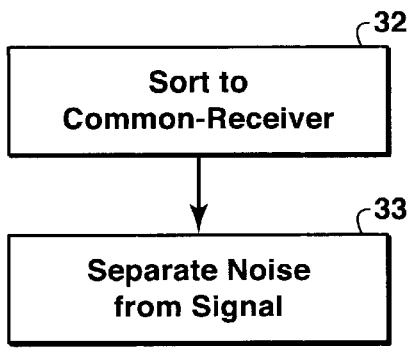
FIG. 4 shows a flowchart of a first embodiment of the present invention for attenuating noise in seismic data traces.

The embodiments of the invention relate to methods for attenuating noise in seismic data traces, at least a portion of the noise being noncoherent in the common-shot domain but coherent in the common-receiver domain. The coherent noise has a move-out velocity different from the move-out velocity of the data signal in the seismic data traces. As shown in FIG. 4, the method comprises two basic steps of sorting the seismic noise into common-receiver order 32 and using the difference in move-out velocities to separate coherent noise from the data signal 33.

In seismic exploration, the terms "signal," "data trace," "seismic data trace," "trace," "shot record," "recorded data," and "measured data" refer to data recorded by a sensor pair after the seismic source has been used to produce a wavefield. A "single shot record" refers to data recorded after a single source excitation (i.e., a single firing of an airgun array). The shot record typically comprises data recorded at each of a plurality of subsea locations with OBC sensors. For example, after the source is fired the wavefield is sampled at a selected sampling rate for a predetermined time interval. The recorded data forms a data signal for each sensor location. A summation of a plurality of signals having common subsurface reflection points may be used to generate a "stack" of data. A stack may then be interpreted to identify and classify "events." Events may comprise, for example, direct arrivals that travel directly from the source to the sensors, primaries that have reflected off of subsea formations (i.e., as a subsea salt structure, or a subsea hydrocarbon-bearing formation), or reflections off of an ocean-air boundary (e.g., ghosts giving rise to multiples).

Sorting the Seismic Data Traces into Common-Receiver Order

We have discovered that the noise on the OBC vertical geophone data represents the shear waves converted from primary wave sources (PS-Waves). The noise exhibits non-coherent or random properties in the original acquisition shot order or common-shot order but exhibits coherent properties in the common-receiver order. In common-shot order all the traces recorded for a single shot are plotted in a two-dimensional fashion with a trace's location from the shot location being the shot-to-geophone distance (for all the receivers) and with time being the other dimension. Whereas, in common-receiver order all the traces recorded at one particular receiver location are typically organized in a two-dimensional fashion with a trace's location from the receiver location being shot-to-geophone distance (for all shots recorded) and time being the other dimension. Therefore, the original common-shot order needs to be sorted into a common-receiver order.

Sorting from original common-shot order to common-receiver order involves separating the data based on the receiver location. Once separated or sorted into common-receiver data at least a portion of the noise and signal are coherent in the common-receiver order.

Separating the Coherent Noise from the Data Signals

As stated above, the noise on the geophone data represents shear waves converted from primary wave sources (e.g., PS-waves). P to S converted waves and reflected monotype (PP-waves) waves have substantially different move-out velocities. This fact allows use of filters (e.g., multi-channel filters) to separate the converted shear waves (noise) and reflected PP-waves (the signal component or signal). A filter is part of a system that discriminates against some of the information entering it. The discrimination is usually on the basis of frequency, although other bases (i.e., wavelength, moveout velocity, coherence, or amplitude) may be used. Either signal or noise may be filtered out. While filtering is well known in the art the discovery that geophone data noise is coherent in the common-receiver order but not in the common-shot order permits the noise to be filtered. Therefore, the noise cannot be effectively filtered in the common-shot order.

A preferred embodiment of the present invention is to correct the seismic data after the traces are sorted into common-receiver order by performing a normal-moveout correction and then separating the coherent noise from the data signal. A normal moveout is the variation of reflection arrival time because of the source-to-geophone distance (offset). Therefore, the normal-moveout correction is a time correction applied at an arrival at some distance between the source-to-receiver location that makes the arrival appear to have been recorded at a zero distance source-to-receiver location.

As stated above the noise is characterized by substantially lower moveout velocity than the signal. This fact enables use of multidimensional filters for their separation. A moveout correction before multichannel filtering is not a required step but it may significantly simplify the filter design.

We have discovered that the velocity for the hyperbolic moveout approximation of the PS-waves rarely exceeds 1500 meters/second (m/sec). However, primary reflected PP-waves in the OBC environment have moveout velocities higher than 1500 m/sec. The velocity of sound in water is defined at approximately 1500 m/sec and does not significantly change due to the usual variations in water depth and sediment velocities. Therefore, the hyperbolic moveout correction of the velocity of sound in water represents a general parameter with worldwide applicability. After performing a normal-moveout correction of common-receiver gathers using a velocity of 1500 m/sec the resulting PP events will be overcorrected and the noise (PS events) will be undercorrected with a relatively flat line. The characteristics of PP- and PS-waves permit separating the signal and the noise using data independent multi-channel filters. While a preferred embodiment is to use the velocity of sound in water any velocity can be chosen so long as the velocity will overcorrect the signal and undercorrect at least a portion of the noise.

Another preferred embodiment in separating the noise from the signal is to perform a multi-channel transformation of the common-receiver data from the original x-t domain. A transformation is the conversion from one representation to another. For this data we take data traces in the x-t two-dimensional space or where x is the source-geophone distance (offset) and t is the arrival time or two-way traveltimes and map the data into a different two-dimensional space in which the data and the noise are separated. Different transformations may be used by using different filters (i.e., f-k, tau-p, radon etc). One two-dimensional transform is the Fourier transform, which converts a time-function seismic data trace into a frequency-domain representation. The tau-p transformation is a conversion of x to p (where p is the reciprocal of the apparent velocity and is also called apparent slowness) and tau is the intercept time at x=0. The tau-p transform is also called tau-p mapping and a radon transform. Those skilled in the art will recognize other domains suitable for this technique.

The preferred approach is to use the Fourier or f-k transform. After the f-k transform, energy from the under-corrected noise is localized in the half plane of negative spatial frequency (negative k-parameter). Whereas, overcorrected signal energy is localized in the positive k half plane. However, if the data has not been corrected (e.g., using a normal moveout of the velocity of sound in water) a velocity separation line will need to be defined that separates the noise from the signal. Once the velocity line is defined, the noise or signal can be removed by removing data above or below the line.

The signal or the data needs to be separated or filtered. The type of filtering utilized will depend on the type of transformation and how the data was treated. In the f-k domain, the overcorrected signal is localized in the upper half plane of the f-k plane, which corresponds to positive k values. Alternatively, the under-corrected noise is located in the lower half plane, which corresponds to negative k-values. Those skilled in the art will recognize that the k sign depends on the sign convention used for a particular f-k transform implementation and therefore, it may be reversed. In this example, the noise removal may be achieved by zeroing or reducing the lower half plane of the f-k plane.

Figure 1:
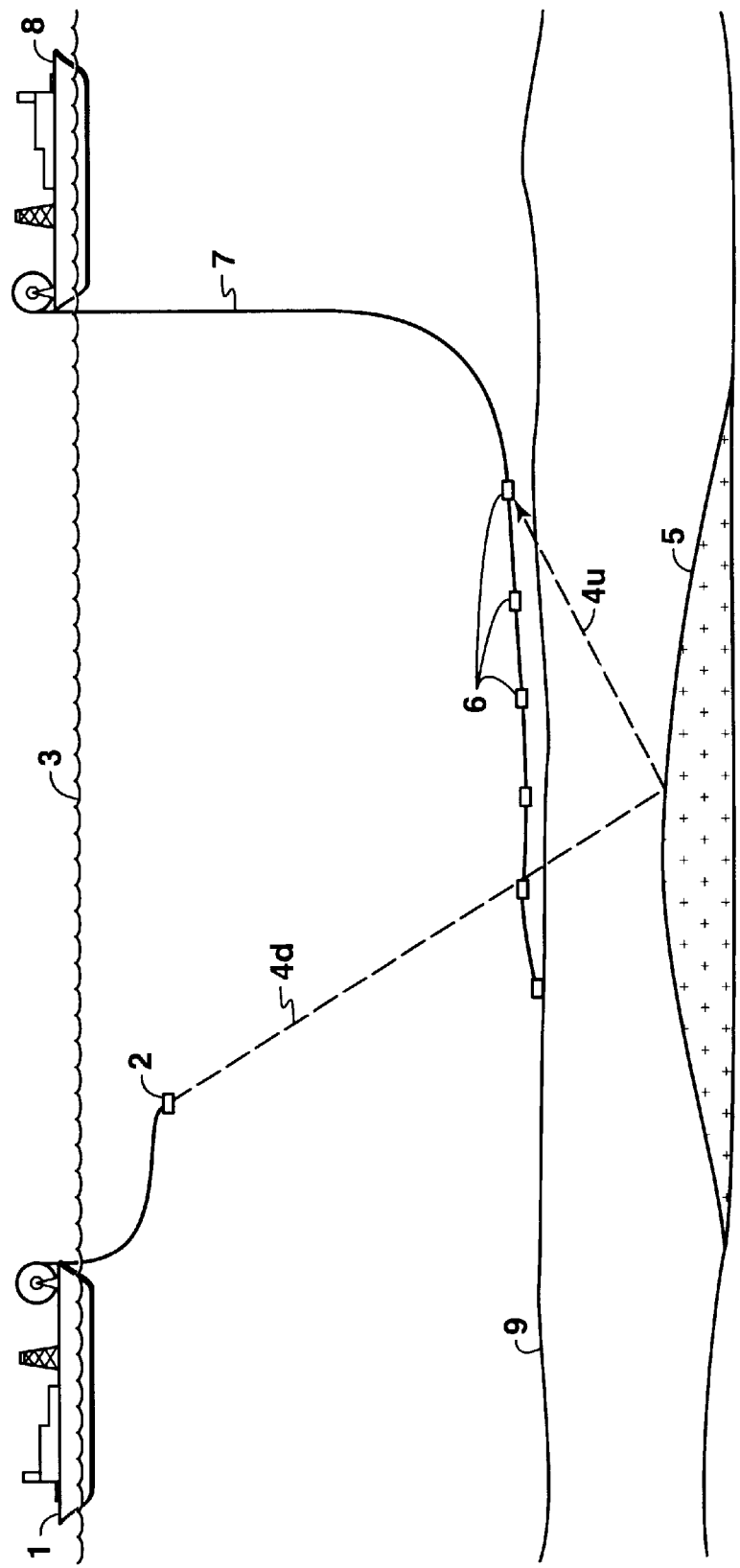
FIG. 1 shows a prior art ocean bottom cable (OBC) marine seismic acquisition system.
Figure 2:
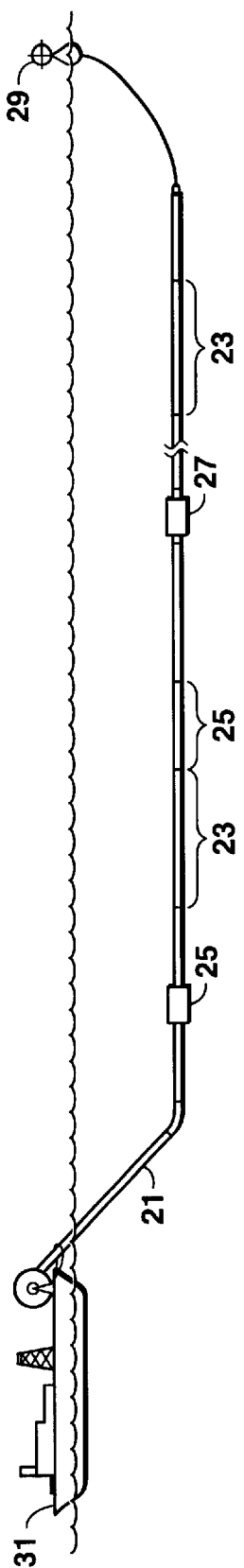
FIG. 2 shows a prior art ocean streamer cable marine seismic acquisition system.
Figure 3B:
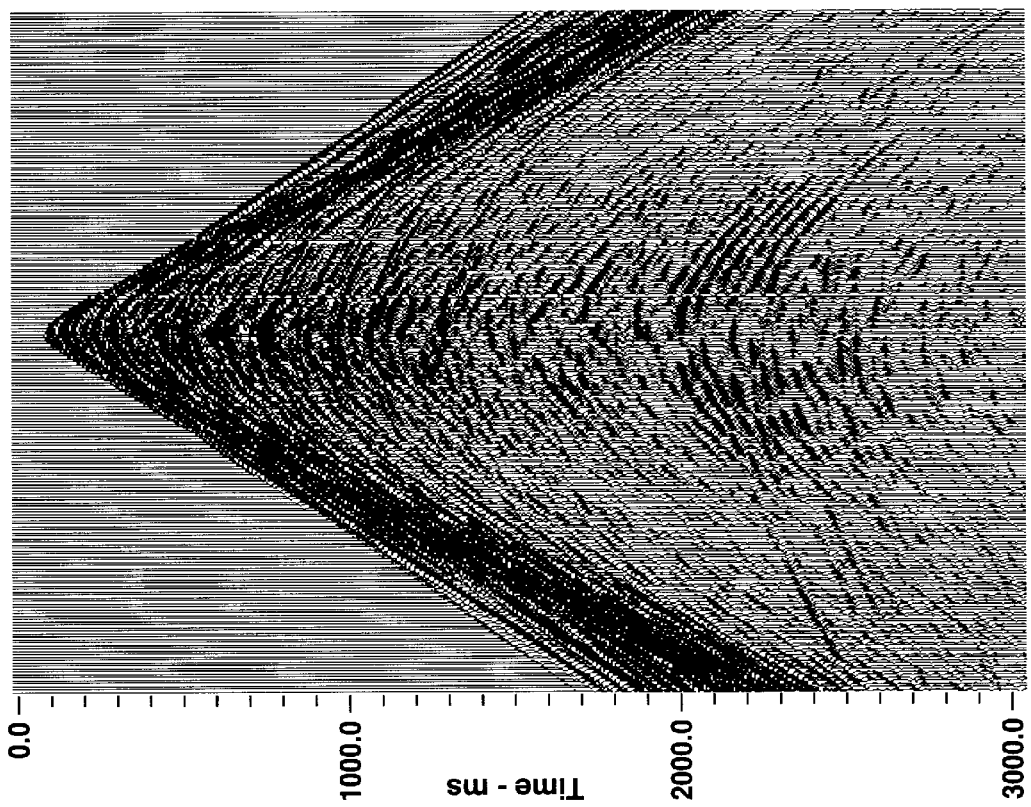
FIG. 3(b) shows seismic data traces collected using a vertical geophone on a 2C OBC.
Figure 3A:
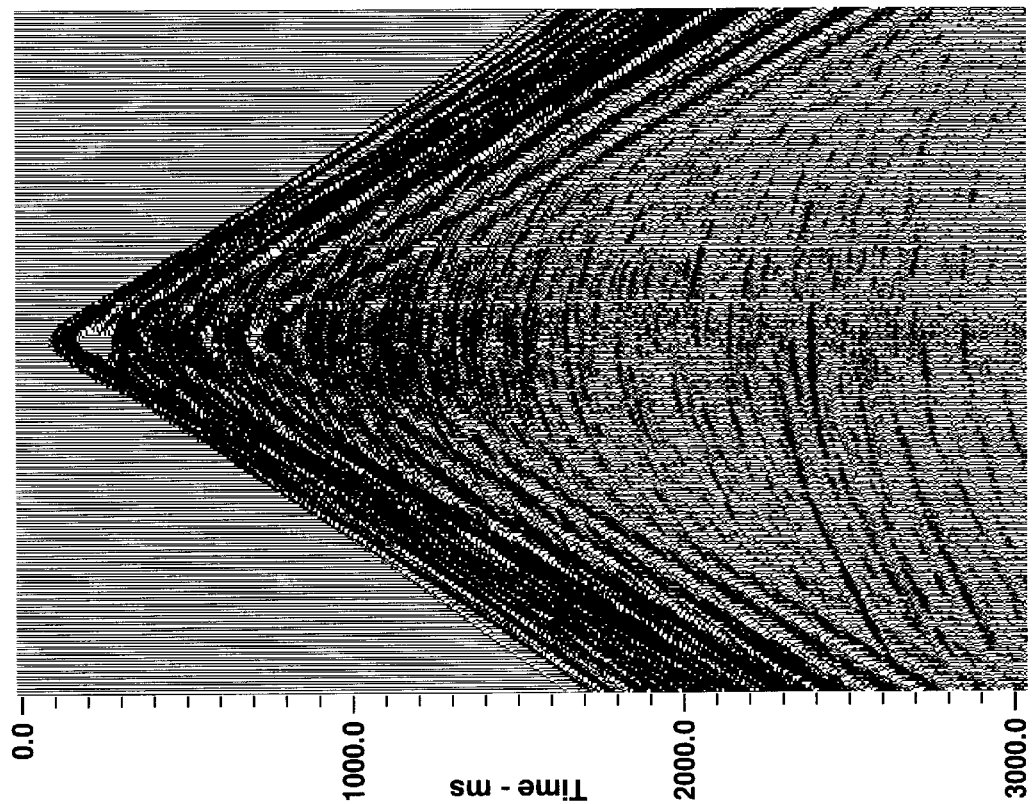
FIG. 3(a) shows seismic data traces collected using a hydrophone on a 2C OBC.
Figure 5B:
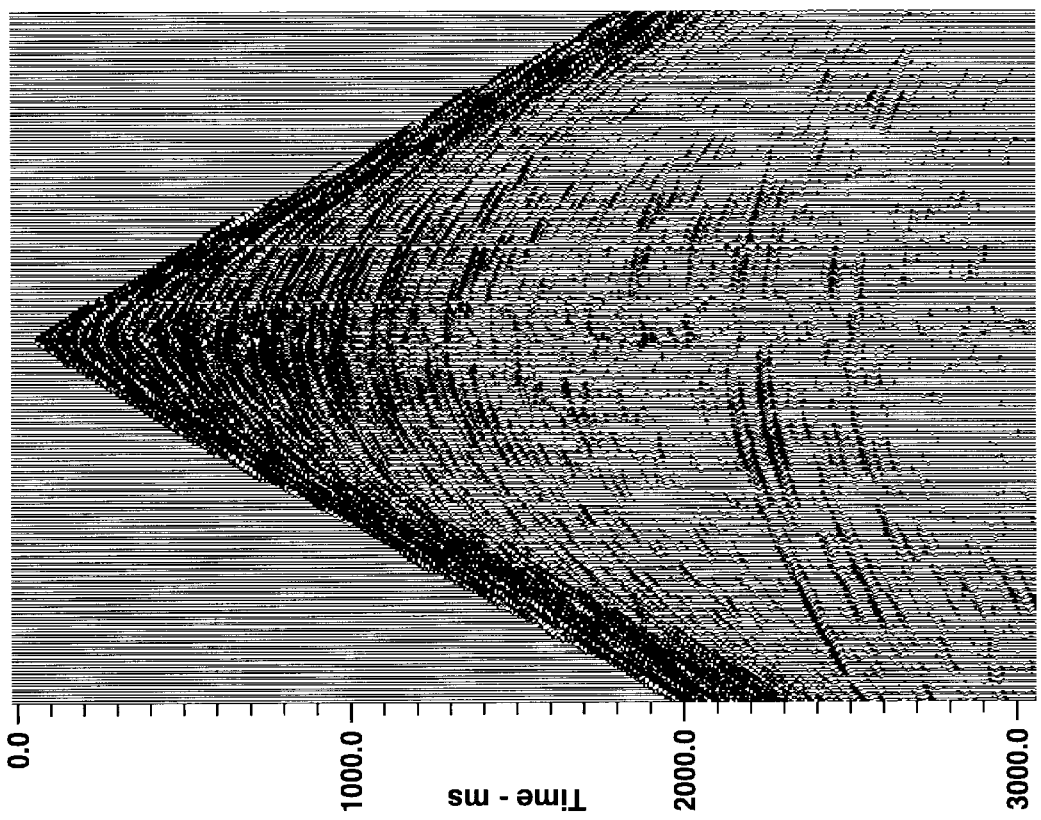
FIG. 5(b) shows the geophone seismic data traces from FIG. 3(b) after processing using an embodiment of this invention.
Figure 5A:
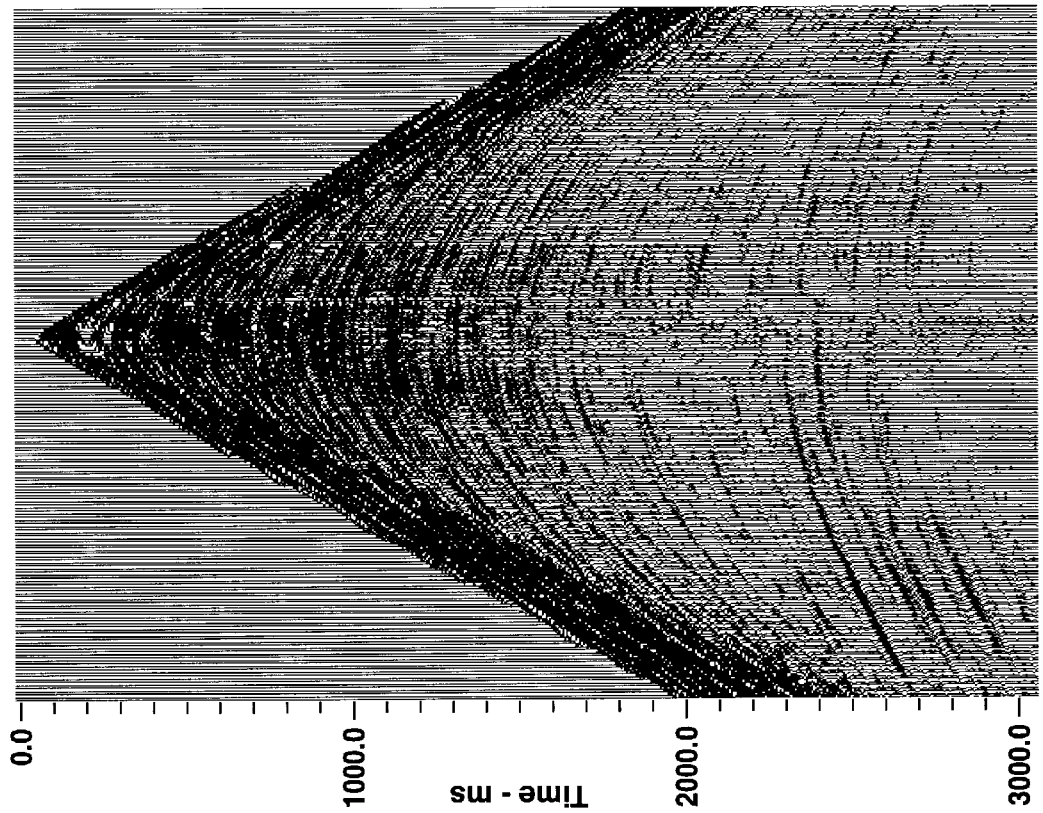
FIG. 5(a) shows the hydrophone seismic data traces from FIG. 3(a) after processing using an embodiment of this invention.

An inverse multi-channel transformation may be performed if the data was previously transformed and there is a need for the data to be in conventional x-t two-dimensional space. This step should be consistent with the previous transformation performed before the filtering. For example, if the forward f-k transform was previously used then an inverse f-k transform should be used and if a forward tau-p transform was used then an inverse tau-p transform should be performed. If a normal moveout was performed and the data needs to be in the original format, an inverse normal moveout can be performed to keep the seismic traces in original format with the noise suppressed. Furthermore, the data may be left in common-receiver domain or sorted back to common-shot domain. FIGS. 5(a) and 5(b) respectively show the hydrophone and geophone seismic data traces from FIGS. 3(a) and 3(b) after the noise is separated from the data. The geophone data as shown in FIG. 5(b) illustrates that the noise is significantly attenuated when compared to the original data as shown in FIG. 3(b).

While most of the observed noise is in the geophone data, this technique can be applied to hydrophone data. Therefore, this method works for geophone and hydrophone data. Preferably, if the geophone and hydrophone data are to be summed, during subsequent processing, the same technique would be applied to both the geophone and hydrophone data.

An improved summation process is disclosed in co-pending U.S. application Ser. No. 60/293,716. The summation process requires selection of either the pressure trace or the velocity trace for processing. Polarity differences between recorded pressure and velocity measurements are used to identify and separate primary and source side peg-leg multiples from down-going wavefields. After matching the recorded signals, processing techniques of the invention, based on a mathematical reformulation of the ocean bottom dual sensor problem, are applied to the matched pressure and velocity data. The down-going wavefield is estimated by subtracting the velocity from the pressure and dividing by two. The down-going wavefield is multiplied by a factor that includes an estimate R* (which may be an estimate for the water bottom reflection coefficient, R) and subtracted (or added) to the pressure (or velocity). In this way the down-going wavefield can be used to eliminate the trapped water bottom multiples, receiver side peg-leg multiples, and source side peg-leg multiples.

The noise attenuation technique is suitable for eliminating noise from shear waves. Shear waves are conventionally collected using geophones. It has been claimed that converted waves or shear waves can be obtained from processing conventional streamer data (The Diamond Companies Announce Two More Breakthrough 3-D Technologies, The Leading Edge, v. 20, No. 1, pp. 22–23, January 2001). Accordingly, this technique can be used to attenuate noise from conventional streamer data.

EXAMPLE

Figure 6:
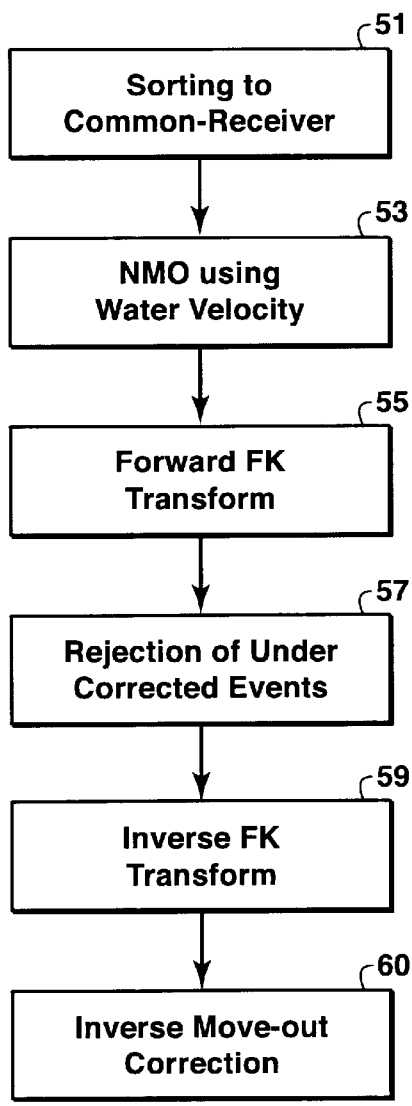
FIG. 6 shows a flowchart of a second embodiment of the present invention for attenuating noise in seismic data traces.

FIG. 6 is a flow chart of a preferred embodiment of the present invention for attenuating noise in two-component ocean bottom cable data using an f-k domain filter. FIGS. 7(a)–(e) are graphs of the data illustrating the processing steps. As shown in FIG. 6, the seismic traces are sorted from common-shot domain to common-receiver domain 51. Then a normal-moveout correction is performed using the velocity of water so that the signal is overcorrected and the noise is undercorrected 53. A forward f-k transform is performed on the normal-moveout corrected seismic traces 55. The transformed data traces are filtered to remove the noise by rejecting the undercorrected events 57. Finally, an inverse f-k transform is performed to transform the data into the original x-t two-dimensional space 59 and an inverse moveout correction may be applied 60.

Figure 7C:
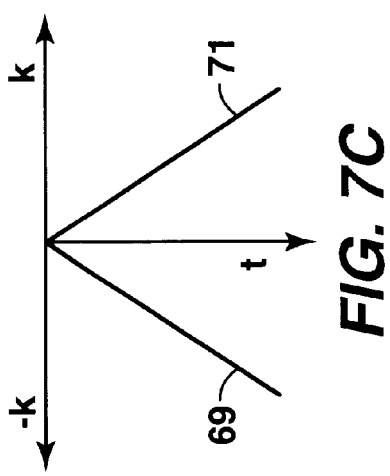
FIG. 7(a) through 7(e) schematically illustrate a preferred embodiment of the present invention.
Figure 7D:
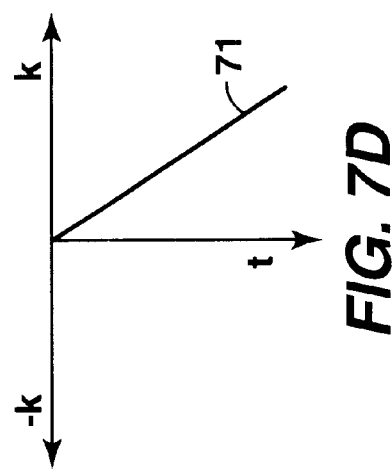
Figure 7B:
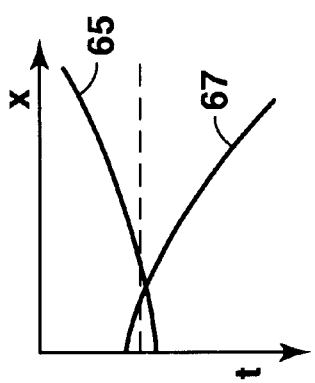
Figure 7E:
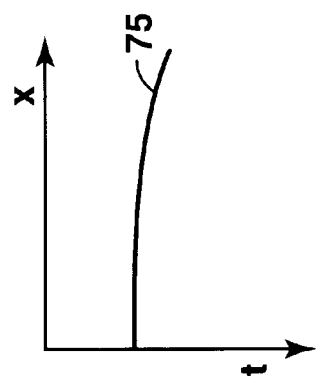
Figure 7A:
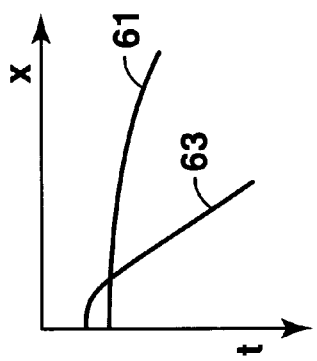

FIGS. 7(a)–(e) illustrate the proposed method. FIG. 7(a) is an x-t graph illustrating the velocity difference between the signal 61 and noise 63 in common-receiver domain. The figure illustrates that both the noise and signal are coherent in the common-receiver order. It is the separation in velocities that enables the noise or signal to be filtered. A normal-moveout correction is applied to the data in common-receiver order. FIG. 7(b) shows that after the normal-moveout correction the noise 67 is undercorrected while the signal 65 is overcorrected. After the normal-moveout correction the multi-trace transformation of the seismic data traces is performed. In this example, a f-k transform filter is used. As shown in FIG. 7(c), energy of the undercorrected coherent noise 69 is concentrated in the lower half plane of negative spatial frequency or negative k-parameter, whereas the overcorrected signal 71 is localized in the positive k half plane.

While the seismic data traces are in the two-dimensional domain, the noise or signal may be filtered. In this example, filtering involves zeroing of the negative half plane of the initial f-k spectrum or suppression of the coherent noise. FIG. 7(d) illustrates the results of zeroing the negative half plane to suppress the noise but not the signal 71. The filter design or definition of the area of suppression is very simple and would have a universal character if a normal moveout with a velocity of 1500 m/sec is performed. Therefore, using a normal moveout correction of approximately 1500 m/sec would enable a specifically designed filter and filtering procedure to be utilized worldwide. An inverse multitrace transform is performed which in this example is an inverse f-k transform which yields common-receiver gather with noise significantly reduced as shown in FIG. 7(e). FIG. 7(e) illustrates the signal 75 sorted back to common-receiver domain without the noise.

Figures 8A, 8B:
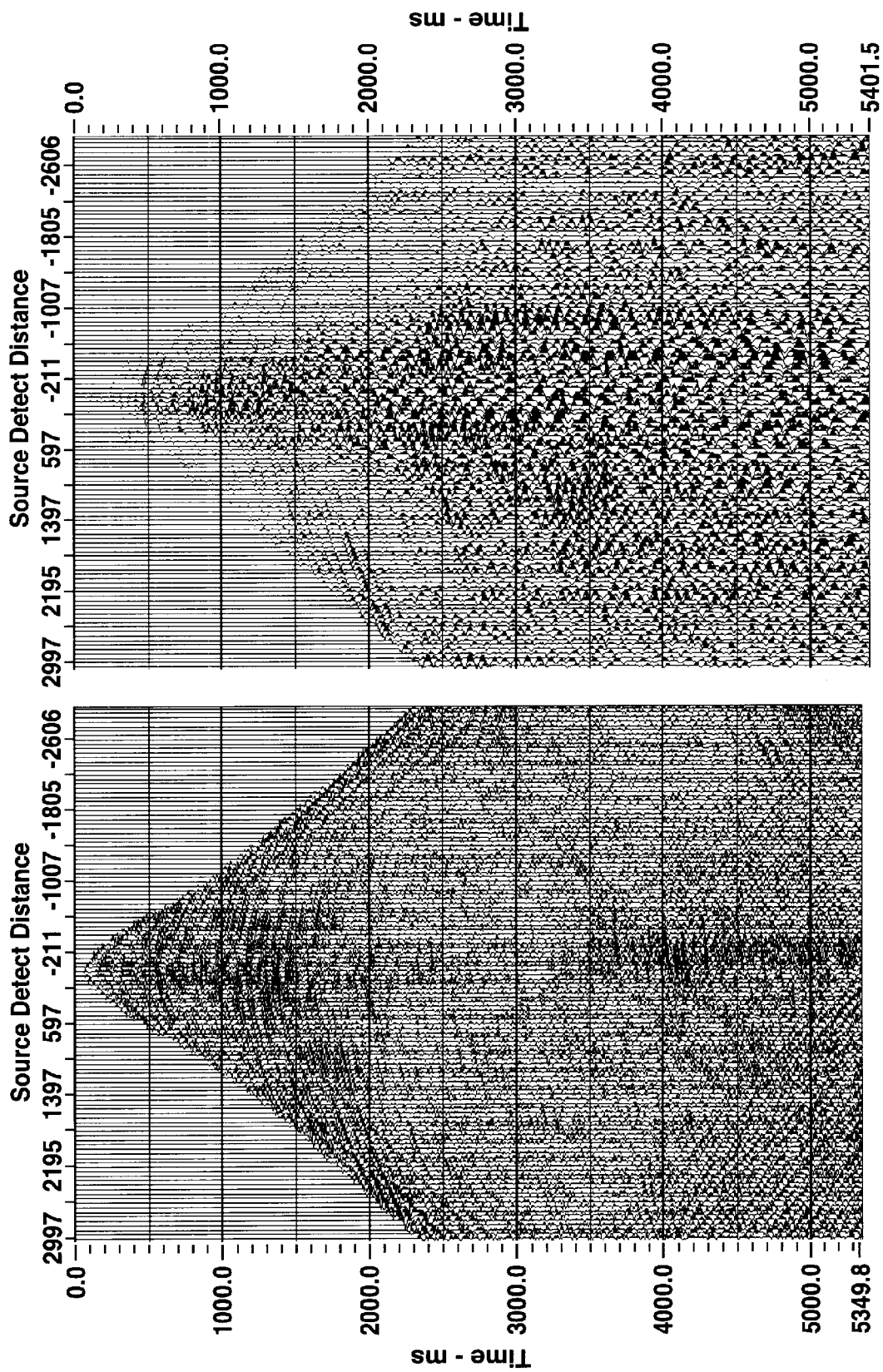
FIG. 8(a) shows seismic data traces in common-shot order collected using a hydrophone on a 2C OBC.
FIG. 8(b) shows seismic data traces in common-shot order collected using a vertical geophone on a 2C OBC.
Figure 9B:
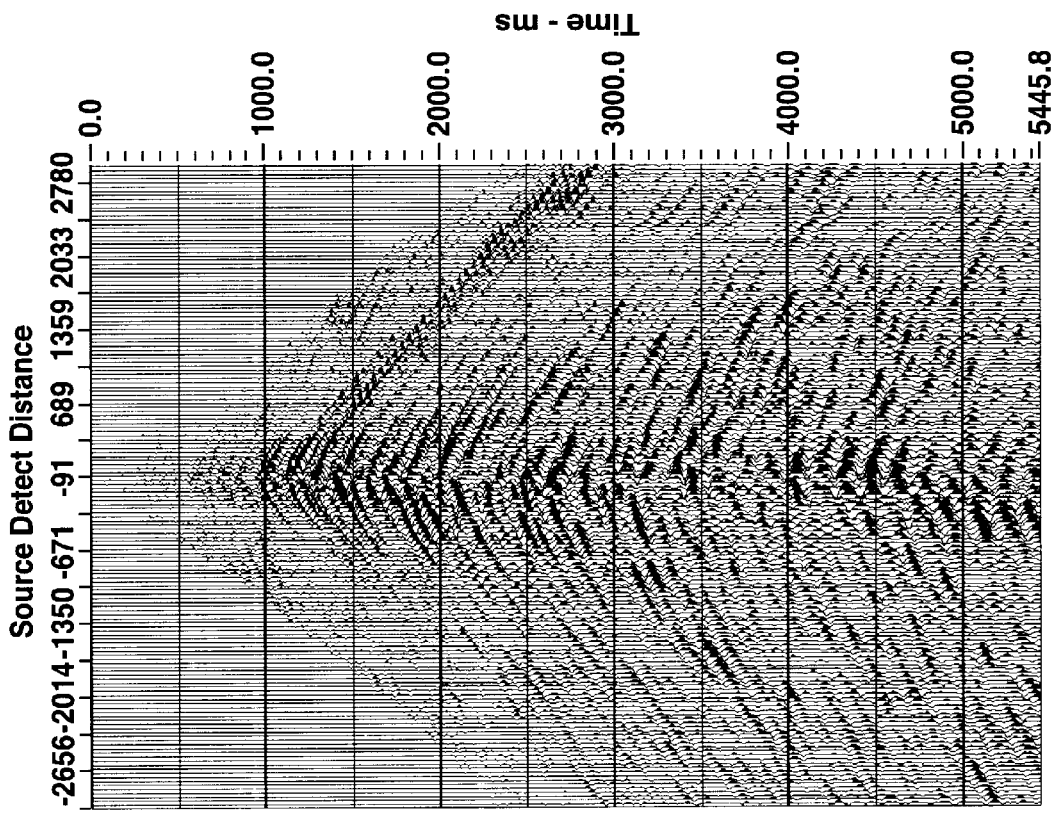
FIG. 9(b) shows the seismic data traces from FIG. 8(b) in common-receiver order.
Figure 9A:
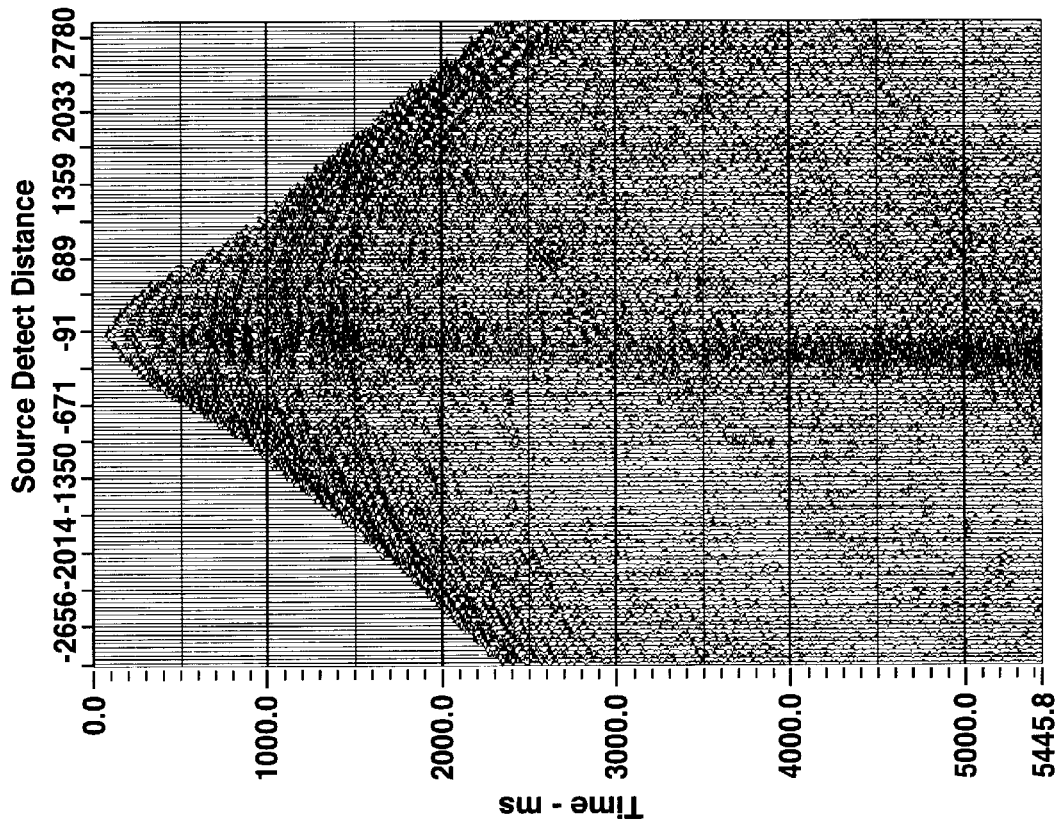
FIG. 9(a) shows the seismic data traces from FIG. 8(a) in common-receiver order.
Figure 10:
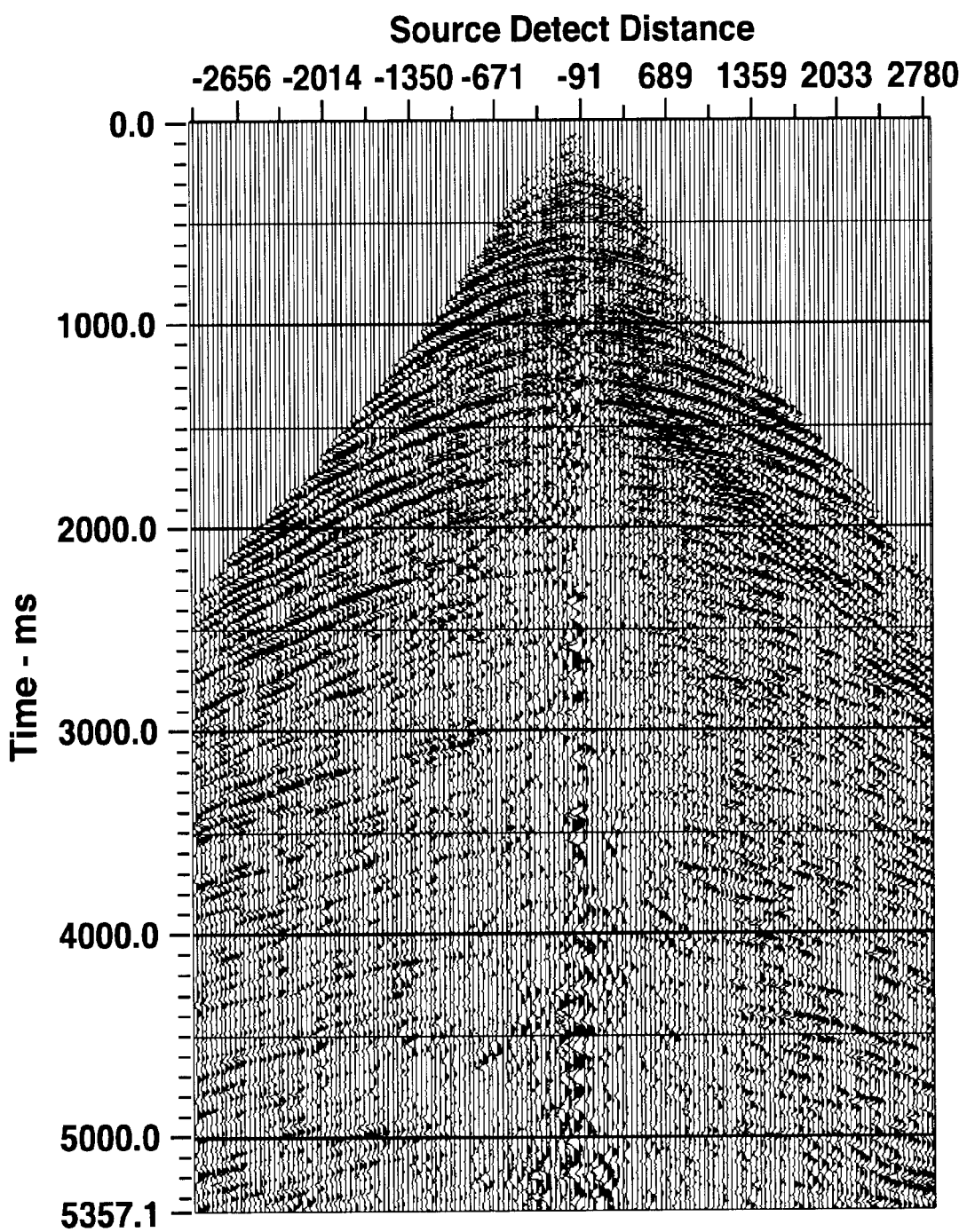
FIG. 10 shows geophone seismic data traces from FIG. 9(b) in common-receiver order after processing using the steps outlined in the flowchart of FIG. 6.

FIGS. 8–10 illustrate application of the proposed method to a dataset. The initial common-shot data are shown in FIGS. 8(a) and 8(b). The hydrophone data, in FIG. 8(a), exhibits more random noise compared to the geophone data in FIG. 8(b). FIGS. 9(a) and 9(b) respectively, illustrate the same data from FIGS. 8(a) and 8(b) after the data is sorted to common-receiver order. The behavior of the hydrophone signal in FIG. 9(a) is similar to the hydrophone data in common-shot trace order illustrated in FIG. 8(a). However, the geophone data exhibits a coherent noise pattern in FIG. 9(b) that is different than the common-shot order in FIG. 8(b). Therefore, application of the proposed method permits separation of at least part of the noise on the geophone. FIG. 10 shows geophone seismic data traces that have been sorted into common-shot order from common-receiver order as shown in FIG. 9(b) after processing using the inventive noise separation technique explained in the example. FIG. 10 illustrates significantly less noise on the vertical geophone data than before the noise separation technique was applied on the vertical geophone data as shown in FIG. 9(b). Therefore, application of the proposed method significantly reduces the noise on the geophone.

The embodiments described and as applied in the modeled and processed results are intended to clarify the application of the invention to both modeled and real world data. Those skilled in the art will appreciate that other embodiments of the invention can be devised which do not depart from the spirit of the invention as disclosed herein. Accordingly, the scope of the invention should be limited only by the following claims.

What is claimed is:

1. A method for attenuating noise in seismic data traces, said method comprising:
   providing seismic data traces, wherein at least a portion of said noise in seismic data traces is noncoherent in the common-shot order but coherent in the common-receiver order, with at least a portion of said coherent noise having a move-out velocity different from the move-out velocity of the data signal in said seismic data traces;
   sorting said seismic data traces into common-receiver order; and
   using said difference in move-out velocities to separate at least a portion of said coherent noise from said data signal.

2. The method of claim 1 further comprising correcting said seismic data traces after sorting said seismic data traces into common-receiver order by performing a normal moveout of said data with a velocity chosen to overcorrect the signal and undercorrect at least a portion of the noise.

3. The method of claim 2 wherein said normal move out correction of said seismic data traces is performed using a move-out velocity approximately equal to the velocity of sound in water.

4. The method of claim 2 said method further comprising applying an inverse of said normal-moveout correction to said seismic traces after separating at least a portion of said coherent noise.

5. The method of claim 1 wherein said seismic data traces comprise geophone seismic data traces.

6. The method of claim 1 wherein said seismic data traces comprise hydrophone seismic data traces.

7. The method of claim 1 wherein said seismic data traces comprise both geophone and hydrophone seismic data traces.

8. The method of claim 1 wherein said seismic data traces comprise both geophone and hydrophone seismic data traces said method further comprising combining geophone and hydrophone seismic data traces after separating at least a portion of said coherent noise from said seismic data traces by applying a summation of the geophone and hydrophone seismic data traces.

9. The method of claim 1 wherein said seismic data traces are collected using a two-component ocean bottom cable.

10. The method of claim 1 wherein said seismic data traces are collected using a four-component ocean bottom cable.

11. The method of claim 1 wherein said seismic data traces are collected using an ocean streamer.

12. The method of claim 1 wherein said step of using said difference in move-out velocities to separate at least a portion of said coherent noise from said data signal further comprises:
   applying a move-out correction to said seismic data traces using a move-out velocity chosen to overcorrect said data signal and undercorrect said coherent noise;
   transforming said move-out corrected seismic data traces from the x-t domain to a two-dimensional domain in which said data signal and said coherent noise are separated;
   removing at least a portion of said coherent noise from said transformed seismic data traces; and
   inverse transforming said seismic data traces from said two-dimensional domain back to the x-t domain.

13. The method of claim 12 wherein said moveout correction of said seismic data traces is performed using a move-out velocity approximately equal to the velocity of sound in water.

14. The method of claim 12 wherein said method further comprises applying an inverse of said normal moveout correction after said data traces have been transformed from said two-dimensional domain back to the x-t domain.

15. The method of claim 12 wherein said seismic data traces comprise geophone seismic data traces.

16. The method of claim 12 wherein said seismic data traces comprise hydrophone seismic data traces.

17. The method of claim 12 wherein said seismic data traces comprise both geophone and hydrophone seismic data traces.

18. The method of claim 12 wherein seismic data traces comprise both geophone and hydrophone seismic data traces said method further comprising combining said geophone and hydrophone seismic data traces after removal of at least a portion of said coherent noise from said seismic data traces by applying a summation of the geophone and hydrophone seismic data traces.

19. The method of claim 12 wherein said seismic data traces are collected using a two-component ocean bottom cable.

20. The method of claim 12 wherein said seismic data traces are collected using a four-component ocean bottom cable.

21. The method of claim 12 wherein said seismic data traces are collected using an ocean streamer.

22. The method of claim 12 wherein said two-dimensional domain is selected by choosing at least one filter from the group consisting of the f-k filter, the tau-p filter, and the radon filter.

23. The method of claim 2 wherein said step of using said difference in move-out velocities to separate said coherent noise from said data signal further comprises:
   transforming said move-out corrected seismic data traces from the x-t domain to a two-dimensional domain in which said data signal and said coherent noise are separated;
   defining a velocity separation line between said data signal and said coherent noise;
   removing at least a portion of said coherent noise from said transformed seismic data traces; and inverse transforming said seismic data traces from said two-dimensional domain back to the x-t domain.

24. The method of claim 23 wherein said seismic data traces comprise geophone seismic data traces.

25. The method of claim 23 wherein said seismic data traces comprise hydrophone seismic data traces.

26. The method of claim 23 wherein said seismic data traces comprise both geophone and hydrophone seismic data traces.

27. The method of claim 23 wherein said seismic data traces comprise both geophone and hydrophone seismic data traces and said method further comprising combining geophone and hydrophone seismic data traces after removal of at least a portion of said coherent noise from said seismic data traces by applying a summation of said geophone and hydrophone seismic data traces.

28. The method of claim 23 wherein said seismic data traces are collected using a two-component ocean bottom cable.

29. The method of claim 23 wherein said seismic data traces are collected using a four-component ocean bottom cable.

30. The method of claim 23 wherein said seismic data traces are collected using an ocean steamer.

31. The method of claim 23 wherein said two-dimensional domain is selected by choosing at least one filter from the group consisting of the f-k filter, the tau-p filter, and the radon filter.

32. A method for attenuating noise in an ocean bottom cable (OBC) seismic data traces, said method comprising:

providing said OBC seismic data traces comprising at least vertical geophone data traces, wherein at least a portion of said noise in seismic data traces is noncoherent in the common-shot order but coherent in the common-receiver order, with at least a portion of said coherent noise having a move-out velocity different from the move-out velocity of the data signal in said seismic data traces;

sorting said data traces into common-receiver order;

applying a move-out correction to said data traces using a move-out velocity chosen to overcorrect said data signal and undercorrect said coherent noises;

transforming the move-out corrected data traces from the x-t domain to a two-dimensional domain in which said move-out corrected data signal and said move-out corrected noise are separated;

removing at least a portion of said coherent noise from said transformed data traces; and inverse transforming said data traces from said two-dimensional domain back to the x-t domain.

33. The method of claim 32 wherein said move out correction of said data traces is performed using a move-out velocity approximately equal to the velocity of sound in water.

34. The method of claim 32 said method further comprising combining geophone and hydrophone seismic data traces after removal of at least a portion of said coherent noise from said seismic data traces by applying a summation of the geophone and hydrophone seismic data traces.

35. The method of claim 32 wherein said two-dimensional domain is selected by choosing at least one filter from the group consisting of the f-k filter, the tau-p filter, and the radon filter.

* * * * *